J. W. PHILLIPS.
GAS ENGINE STARTING DEVICE.
APPLICATION FILED FEB. 25, 1920.
1,375,172.   Patented Apr. 19, 1921.
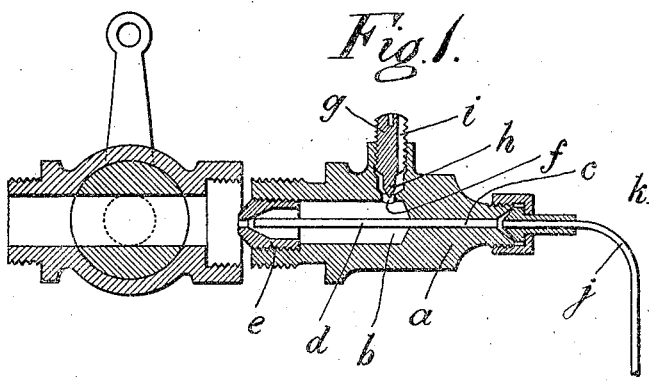
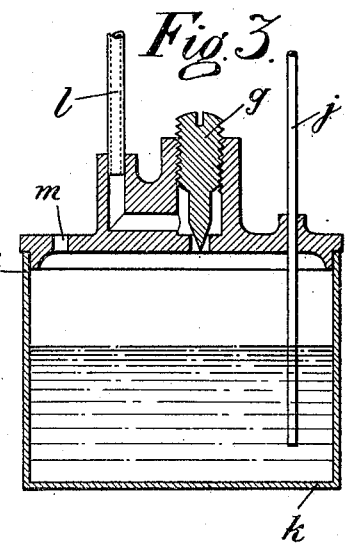
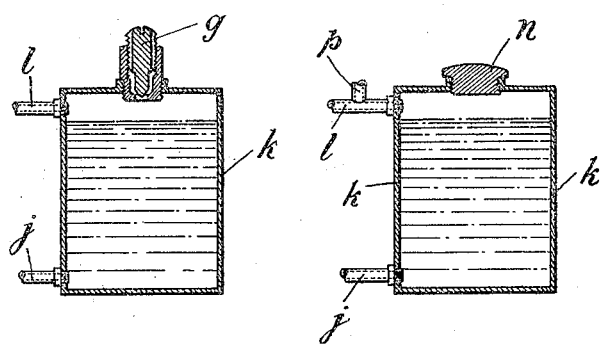
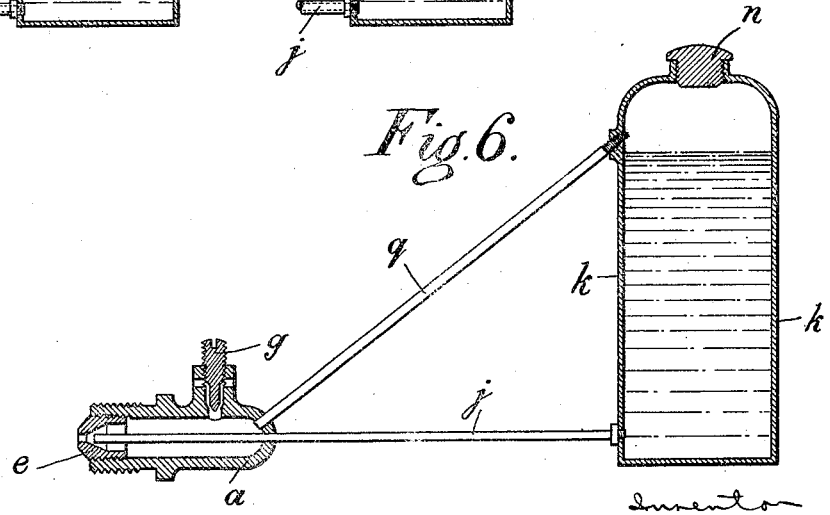

UNITED STATES PATENT OFFICE.

JOHN WILLIAM PHILLIPS, OF HENDON, ENGLAND, ASSIGNOR TO BISHOPSGATE GENERAL TRADING COMPANY LIMITED, OF LONDON, ENGLAND.

GAS-ENGINE-STARTING DEVICE.

1,375,172.  Specification of Letters Patent.  Patented Apr. 19, 1921.

Application filed February 25, 1920. Serial No. 361,194.

*To all whom it may concern:*

Be it known that I, JOHN WILLIAM PHILLIPS, a subject of the King of Great Britain, residing at Hendon, Middlesex, England, have invented certain new and useful Improvements in Gas-Engine-Starting Devices, of which the following is a specification.

The object of my invention is to construct an apparatus for enabling internal combustion engines to be readily started in a simple and efficient manner and for that purpose my apparatus comprises a fixed tubular casing, having a chamber, a passage way leading to the chamber from one end of the casing and a petrol pipe leading from the passage way and positioned in the chamber, an air hole in the chamber wall and a nozzle at the end of the chamber opposite to the passage way and adjacent to the end of the petrol pipe and means on the ends of the casing for connection respectively to the induction pipe of the engine and a pipe leading to the float chamber or petrol tank. The air hole in the chamber wall may be supplied with a valve for determining the supply of air to the chamber or I may have a plain air hole in the chamber wall and connect same by a pipe to a valve connected with an auxiliary petrol tank which also has a plain air hole to supply air to the tank and pipe and keep the pressure of air therein normal or such pipe may lead direct to the petrol tank and the tank have a valved opening and in cases where the petrol tank is provided with a closed stopper the valve may be positioned in a branch from the air pipe leading from petrol tank to the chamber and where I employ a valved air opening to the chamber I may also run a pipe from the chamber to the petrol tank to supply air to the tank to prevent a vacuum therein.

My invention will be clearly understood from the following description aided by the annexed drawings in which—

Figure 1 is a sectional elevation of my device.

Fig. 2 is a sectional elevation of an adaptor I may employ.

Fig. 3 is a sectional elevation of an auxiliary petrol tank and showing one method of connecting the air supply pipe and valve.

Figs. 4 and 5 are sectional elevations of two auxiliary petrol tanks and showing modified forms of the air supply devices.

Fig. 6 is a sectional elevation of my device and a petrol tank and showing the connection and also a method of preventing a vacuum in the petrol tank.

According to this invention and as I show at Fig. 1, I construct the apparatus from a tubular body $a$ the interior of which is of two diameters $b$, $c$ the larger diameter $b$ forming a chamber and the smaller diameter $c$ a passage way and I connect up the passage way with a tube $d$ which is positioned inside the chamber $b$ with its free end positioned at or near the open end of the chamber $b$ and the open end of the chamber is contracted or provided with a sleeve $e$ forming a spraying nozzle.

In the body $a$ and preferably near the inner end of the chamber $b$ I form an air hole $f$ having a valve seating and I preferably screw thread this hole and provide same with a screw $g$ having on one end a spigot or point $h$ of reduced diameter which will co-act with the valve seating to control the hole $f$ and I form a groove $i$ or grooves along the length of the screw to form an air passage.

Both ends of the tubular casing are preferably screw threaded, the chamber end for connection to the induction pipe of the engine and the other to the petrol pipe $j$ which is connected up with the float chamber or a separate petrol reservoir and instead of connecting up the chamber end with the induction pipe direct I may have a valved adaptor see Fig. 2, between the casing $a$ and the induction pipe to connect the casing $a$ to the induction pipe above the throttle and to act as a cut off.

On the suction of the engine the petrol is sucked through the pipe $j$ and at the same time air is sucked through the valved hole $f$ into the chamber $b$ and mixing with the petrol at the nozzle $e$ emanates therefrom in spray form and the mixture passes to the engine and by adjusting the screw valve $g$ the quantity of air to the chamber is determined.

Instead of providing the tubular casing $a$ with an air supply valve $g$ I may construct the casing with a plain orifice and provide the auxiliary petrol tank with the air regulating device $g$ see Fig. 3 a tube $l$ connecting such air regulating device *g* with the orifice in the casing *a*, the petrol reservoir being provided with a hole *m* open to the atmosphere so that the air pressure in the tank may remain normal or I may provide the petrol tank *k* with the air regulating device *g* and connect the casing *a* by an air pipe *l* with the petrol tank *k* as at Fig. 4.

Where a closed stopper *n* is employed with the petrol tank *k* as at Figs. 5 and 6 instead of taking the air through the valve *g* as at Fig. 4 and then through the pipe *l* I may form a branch *p* to the pipe *l* and fit therein a regulating device as will be understood from Fig. 5 or I may supply air to the tank to prevent a vacuum therein by connecting up the chamber *b* with the tank *k* by a pipe *q* and position the air valve *g* in the casing *a* as at Fig. 1 and as will be understood from Fig. 6.

In some cases I may introduce compressed air into the auxiliary petrol reservoir to force a mixture of air and petrol through the spray nozzle in the casing, especially with those engines used in aeronautical machines.

What I do claim as my invention and desire to secure by Letters Patent is:—

1. A gas engine starting device comprising a fuel tank, said tank having an air opening therein, a tubular body the interior of which is of two diameters thereby forming a chamber and a passageway terminating at opposite ends of said body, a spray nozzle in the open end of said chamber, a tube in said passageway terminating at one end in said spray nozzle, a fuel pipe connected to said fuel tank and spaced from but in communication with the other end of said tube, means for connecting said tubular body to the induction pipe of the engine and means for introducing air into said chamber.

2. A gas engine starting device comprising a fuel tank having an air opening, a tubular body the interior of which is of two diameters thereby forming a chamber and a passageway terminating at opposite ends of said body, a spray nozzle in the open end of said chamber, a tube in said passageway terminating at one end in said spray nozzle, a fuel pipe connected to said fuel tank and spaced from but in communication with the other end of said tube, means for connecting said tubular body to the induction pipe of the engine and a pipe connecting said air opening in said tank with said chamber whereby vacuum is prevented in said tank.

3. A gas engine starting device comprising a fuel tank having a valved air opening therein, a tubular body having a chamber therein, a spray nozzle for said body, a fuel pipe connecting said tank with said chamber and an air pipe leading from said chamber and communicating with said valved air opening.

In testimony whereof I have hereunto set my hand in presence of two subscribing witnesses.

JOHN WILLIAM PHILLIPS.

Witnesses:
RICHARD CORE GARDNER,
LYNWOOD A. GARDNER.